United States Patent
Takahashi et al.

(10) Patent No.: US 8,098,317 B2
(45) Date of Patent: Jan. 17, 2012

(54) HIGH SPEED PHOTOGRAPHIC DEVICE, METHOD FOR CONTROLLING HIGH SPEED PHOTOGRAPHIC DEVICE, AND COMPUTER PROGRAM

(75) Inventors: Shinya Takahashi, Osaka (JP); Kengo Yanase, Osaka (JP)

(73) Assignee: Keyence Corporation, Osaka (JP)

( * ) Notice: Subject to any disclaimer, the term of this patent is extended or adjusted under 35 U.S.C. 154(b) by 504 days.

(21) Appl. No.: 12/237,415

(22) Filed: Sep. 25, 2008

(65) Prior Publication Data
US 2009/0102938 A1   Apr. 23, 2009

(30) Foreign Application Priority Data
Oct. 18, 2007  (JP) .................................. 2007-270833

(51) Int. Cl.
*H04N 5/222* (2006.01)

(52) U.S. Cl. ............. 348/333.11; 348/207.1; 348/222.1; 348/371

(58) Field of Classification Search .................. None
See application file for complete search history.

(56) References Cited

U.S. PATENT DOCUMENTS

| | | | |
|---|---|---|---|
| 2004/0081437 A1* | 4/2004 | Asada et al. | 386/131 |
| 2005/0052553 A1* | 3/2005 | Kido et al. | 348/296 |
| 2006/0164534 A1* | 7/2006 | Robinson et al. | 348/333.01 |

FOREIGN PATENT DOCUMENTS

| | | |
|---|---|---|
| JP | H06-160171 | 6/1994 |
| JP | 2003-084208 | 3/2003 |

* cited by examiner

*Primary Examiner* — David Ometz
*Assistant Examiner* — Angel L Garces-Rivera
(74) *Attorney, Agent, or Firm* — Kilyx & Bowersox, P.L.L.C.

(57) ABSTRACT

To provide a high speed photographic device which can display in real time a synchronous image photographed in synchronization with motion of a photographic subject. The high speed photographic device (1), which displays in real time a photography image which is in synchronization with a motion cycle of the photographic subject TG, includes: a synchronous cycle adjustment unit (22) which is for designating a synchronous cycle Tsync; a camera (11) which photographs the photographic subject TG at a photography cycle Tshot that is 1/N as long as the synchronous cycle Tsync; and a display unit (14) which displays in real time the photographic subject TG by displaying the photography image of every synchronous cycle Tsync every display cycle Tdisp. The synchronous cycle adjustment unit (22) can adjust the synchronous cycle Tsync at a step width ΔTsync smaller than a visual minimum cycle, within an adjustment range which does not include less than the visual minimum cycle.

20 Claims, 11 Drawing Sheets

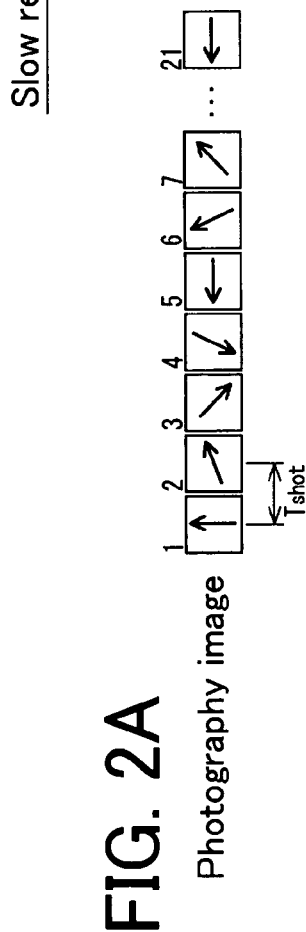
FIG. 2A Photography image
FIG. 2B Display image

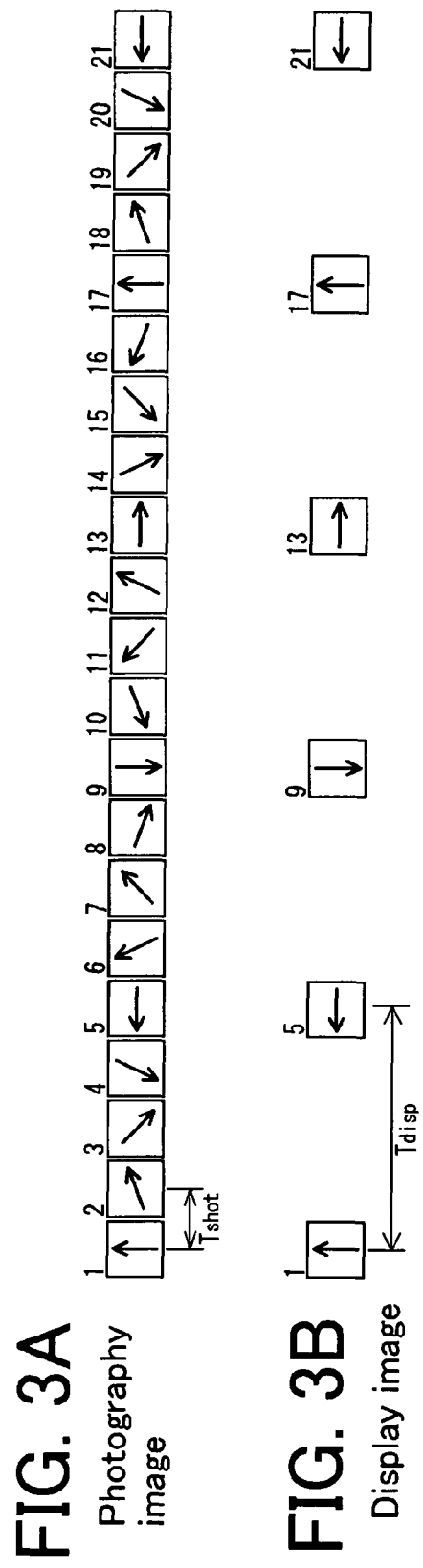
FIG. 3A Photography image
FIG. 3B Display image

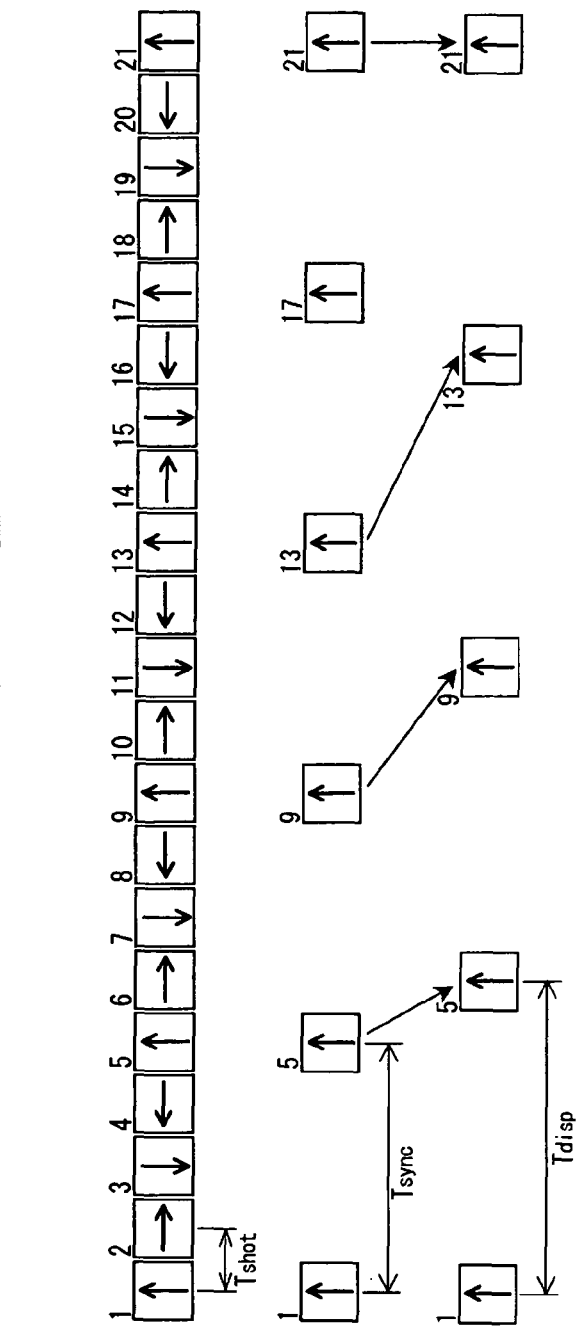

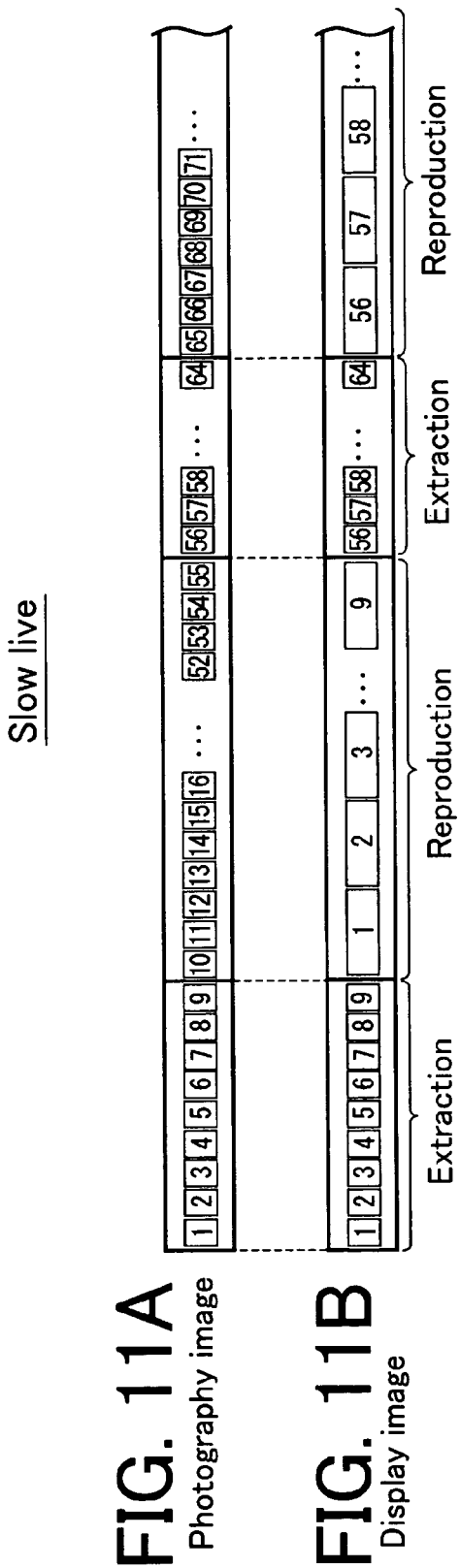

HIGH SPEED PHOTOGRAPHIC DEVICE, METHOD FOR CONTROLLING HIGH SPEED PHOTOGRAPHIC DEVICE, AND COMPUTER PROGRAM

The present application claims priority from Japanese Patent Application No. 2007-270833, filed Oct. 18, 2007, which is incorporated herein by reference.

BACKGROUND OF THE INVENTION

1. Field of the Invention

The present invention relates to a high speed photographic device, a method for controlling a high speed photographic device, and a computer program; and more particularly, the present invention relates to an improvement of a high speed photographic device which is for photographing a photographic subject which periodically repeats high speed motion and for displaying in real time a photography image in synchronization with its motion cycle.

2. Description of the Related Art

A high speed photographic device is a device which can photograph a photographic subject in high speed and, for example, can photograph a photographic subject at a photographing frame rate of 60 to 32000 frames per second (fps). Generally, when a photographing frame rate is higher than a display frame rate, a photography image cannot be directly displayed in real time. Therefore, in this sort of high speed photographic device, there is adopted a method which is slow reproduction and live observation as a method for displaying a photographed photographic subject.

The slow reproduction is a method in which a photography image is once stored in a storage device as picture recording information, and then, the photography image is observed by being displayed at the display frame rate; and the slow reproduction is a picture recording and reproducing method which reproduces at a speed slower than actual motion. In the case of the slow reproduction, all the photography images can be observed without omission; however, the photographic subject cannot be observed in real time. Furthermore, if the photographing frame rate becomes higher, a reproduction time becomes extremely longer as compared with a photography time; and consequently, it becomes difficult to find a photography image to be intended.

On the other hand, the live observation is a method which displays at the display frame rate by thinning the photography image. In the case of the live observation, the photographic subject can be observed in real time; however, a photography image of the photographic subject displayed on a display is a motion state with skipping some parts; and consequently, it is difficult to observe in detail.

In such a high speed photographic device, there is a problem in that adjustment of photographing conditions is not easy. In other photographic device in which a photographic subject remains stationary, an adjustment such as focusing, exposure, and frame rates is made while confirming a photographic screen; however, in the case of the high speed photographic device, even when either the slow reproduction or the live observation is used, an adjustment of such photographing conditions is not easy. That is, if the slow reproduction is used when the photographing conditions are adjusted, adjustment of the photographing conditions and confirmation by the slow reproduction have to be alternately repeated; and consequently, adjustment work becomes complicated and it takes time. On the other hand, if the live observation is used, the adjustment and the observation can be performed at the same time; however, photography images with skipping some parts of the photographic subject which is in high speed motion are displayed on the display one after the other; and consequently, there is a problem in that it is difficult to perform the adjustment of the photographing conditions.

Consequently, as a method which facilitates adjustment of photographing conditions in a high speed photographic device, the following methods are conceivable. As a first method, it is conceivable that the adjustment of the photographing conditions is performed by making a photographic subject remain stationary. However, for example, if in the case of a high speed photographic device which monitors a production line, the production line cannot be stopped only for adjusting the photographing conditions thereof. Therefore, the photographing conditions have to be adjusted in a state where the photographic subject is in high speed motion.

As a second method, it is conceivable that a photography image which makes the photographic subject remain stationary in a pseudo manner is obtained and the adjustment of the photographing conditions is performed by performing synchronous photography in which a photographing frame rate is made to coincide with a motion cycle of the photographic subject. However, in this sort of high speed photographic device, high speed photography is intended; but synchronous photography is not intended; and therefore, the photographing frame rate cannot be finely adjusted and the synchronous photography corresponding to the motion cycle of the photographic subject cannot be performed. For example, user-selectable photographing frame rates are discrete values such as 60, 125, 250, 500, 1000, 2000, 4000, 8000, 16000, and 32000 fps; and since its option is small, it is not possible to photograph the photographic subject in synchronization with motion of a fan which rotates at 32 Hz, for example, and to perform focus adjustment.

As a third method, it is conceivable that a stroboscope (for example, Japanese Unexamined Patent Publication Nos. 6-160171 and 2003-84208) is used. The stroboscope is a device which makes a stroboscopic illuminator for illuminating a photographic subject emit light periodically, and is a device which enables synchronous photography by making a light emitting cycle of the stroboscopic illuminator coincide with a motion cycle of the photographic subject in the case where the photographic subject repeats periodic motion such as rotation and vibration. In other words, by using an exposure difference between when light is emitted and when light is not emitted, the photographic subject is made to remain stationary in a pseudo manner in a state where the stroboscopic illuminator emits light; and accordingly, it becomes possible to photograph a synchronous image in synchronization with the motion cycle of the photographic subject. However, in the case where the synchronous photography is performed using the stroboscope, even when the stroboscopic illuminator is not required as exposure conditions of a camera, the stroboscopic illuminator has to be used; and therefore, there is a problem in that it becomes difficult to downsize an imaging device.

SUMMARY OF THE INVENTION

The present invention has been made in view of the foregoing, and an object of the present invention is to provide a high speed photographic device which can display in real time a synchronous image photographed in synchronization with motion of a photographic subject which is in periodical high speed motion. Furthermore, an object of the present invention is to provide a high speed photographic device which facilitates adjustment for such a real time display. Further, an object of the present invention is to provide a high speed photographic device which can easily designate picture recording conditions of high speed picture recording.

According to a first aspect of the present invention, there is provided a high speed photographic device which photographs a photographic subject which periodically repeats invisible high speed motion, and displays in real time a photography image which is in synchronization with a motion cycle of the photographic subject, the high speed photographic device including: a synchronous cycle adjustment unit which is for designating a synchronous cycle that is M times (M is an integer of not less than 1) as long as the motion cycle; an imaging unit which is made up of a solid state imaging device composed of a plurality of pixels, and repeatedly photographs the photographic subject at a photography cycle that is 1/N (N is an integer of not less than 1) as long as the synchronous cycle; and a display unit which displays in real time the photographic subject by displaying the photography image of every synchronous cycle photographed by the imaging unit, every display cycle of not less than a visual minimum cycle in which switching of display is visible. Then, the synchronous cycle adjustment unit is made up of a unit which adjusts the synchronous cycle at not less than a time which reads one pixel of the solid state imaging device and a step width smaller than the visual minimum cycle, within an adjustment range which does not include less than the visual minimum cycle; and when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle. In addition, the above integer also includes 1, and the high speed photographic device may be configured that the photography cycle is made to coincide with the synchronous cycle.

By such a configuration, the photographic subject photographed every synchronous cycle is displayed in real time by the display unit; and if the synchronous cycle is changed, such change is immediately reflected on the display. Therefore, if the synchronous cycle is adjusted while watching the display in such real time, workability of adjustment work can be improved. In addition, the adjustment range of the synchronous cycle is limited to a range which does not include less than the visual minimum cycle, and at the same time, the step width of the synchronous cycle is set to be narrower than the visual minimum cycle; and accordingly, the synchronous cycle can be finely adjusted. Therefore, the synchronous cycle can be easily and promptly adjusted so as to be an integral multiple as long as the motion cycle of the photographic subject.

According to a second aspect of the present invention, there is provided a high speed photographic device in which, in addition to the above configuration, the photography cycle has the minimum value which is smaller than the visual minimum cycle. The configuration of the high speed photographic device according to the above described first aspect of the present invention is particularly preferable in the case where the photography cycle by the imaging unit is shorter than the visual minimum cycle.

According to a third aspect of the present invention, there is provided a high speed photographic device which photographs a photographic subject which periodically repeats invisible high speed motion, and displays in real time a photography image which is in synchronization with a motion cycle of the photographic subject, the high speed photographic device including: a synchronous cycle adjustment unit which is for designating a synchronous cycle that is M times (M is an integer of not less than 1) as long as the motion cycle; an imaging unit which is made up of a solid state imaging device composed of a plurality of pixels, and repeatedly photographs the photographic subject at a photography cycle that is 1/N (N is an integer of not less than 1) as long as the synchronous cycle; and a display unit which displays in real time the photographic subject by displaying the photography image of every synchronous cycle photographed by the imaging unit, every variable display cycle. Then, the display cycle has the minimum value which is larger than the minimum value of the photography cycle; the synchronous cycle adjustment unit is made up of a unit which adjusts the synchronous cycle at not less than a time which reads one pixel of the solid state imaging device and a step width smaller than the minimum value of the display cycle, within an adjustment range which does not include less than the minimum value of the display cycle; and when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle.

With such a configuration, the photographic subject photographed every synchronous cycle is displayed in real time by the display unit; and if the synchronous cycle is changed, such change is immediately reflected on the display. Therefore, if the synchronous cycle is adjusted while watching the display by the display unit, workability of adjustment work can be improved. In addition, the adjustment range of the synchronous cycle is limited to a range which does not include less than the minimum value of the display cycle, and at the same time, the step width of the synchronous cycle is set to be smaller than the minimum value of the display cycle; and accordingly, the synchronous cycle can be finely adjusted. Therefore, the synchronous cycle can be easily and promptly adjusted so as to be an integral multiple as long as the motion cycle of the photographic subject.

According to a fourth aspect of the present invention, there is provided a high speed photographic device in which, in addition to the above configuration, the display cycle is made to coincide with the synchronous cycle. If the display cycle is made to fluctuate in response to the synchronous cycle and the synchronous cycle is made to coincide with the display cycle, the photography image of the synchronous cycle is not required to display by converting to the display cycle, and the display process becomes easy.

According to a fifth aspect of the present invention, there is provided a high speed photographic device in which, in addition to the above configuration, the display unit displays the latest photography image of the photography image of every synchronous cycle extracted by the thinning process unit. With such a configuration, in the case where the photography image of every synchronous cycle is switched every display cycle and displayed, a display excellent in real time properties can be performed.

According to a sixth aspect of the present invention, there is provided a high speed photographic device in which, in addition to the above configuration, an exposure time adjustment unit which adjusts an exposure time of the imaging unit is included, and the exposure time adjustment unit holds the exposure time constant even in the case where the synchronous cycle is changed. With such a configuration, it is possible to prevent brightness of the photography image from being changed in response to the synchronous cycle, and adjustment work becomes easier.

According to a seventh aspect of the present invention, there is provided a high speed photographic device which photographs a photographic subject which periodically repeats invisible high speed motion, and displays in real time a photography image which is in synchronization with a motion cycle of the photographic subject, the high speed photographic device including: a synchronous cycle adjustment unit for which a user designates a synchronous cycle that is M times (M is an integer of not less than 1) as long as the motion cycle; an imaging unit which is made up of a solid state imaging device composed of a plurality of pixels, and photographs the photographic subject at a constant photography cycle; a thinning process unit which extracts the photography image of every synchronous cycle from the photography image of every photography cycle by thinning the photography image generated by the imaging unit; and a display unit which displays in real time the photographic subject by displaying the photography image of every synchronous cycle extracted by the thinning process unit, every display cycle of not less than a visual minimum cycle in which switching of display is visible. Then, the synchronous cycle adjustment unit is made up of a unit which adjusts the synchronous cycle at not less than a time which reads one pixel of the solid state imaging device and a step width smaller than the visual minimum cycle, within an adjustment range which does not include less than the visual minimum cycle; and when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle. With such a configuration, the photography image of every synchronous cycle can be displayed in real time every display cycle without changing the photography cycle.

According to a high speed photographic device of the present invention, a photographic subject photographed every synchronous cycle is displayed in real time by a display unit, and if the synchronous cycle is changed, such change is immediately reflected on the display. Therefore, the synchronous cycle can be made to easily coincide with an integral multiple as long as a motion cycle of the photographic subject by adjusting the synchronous cycle while watching the display in real time.

In doing so, if the synchronous cycle is made to coincide with an integral multiple as long as the motion cycle of the photographic subject, there can be displayed a photography image as in the case in which a stopped photographic subject is photographed while photographing the photographic subject during high speed motion. In addition, there can be displayed in real time; and therefore, when brightness adjustment and focusing adjustment are performed before high speed picture recording, the adjustment can be made while watching a real time display of the photographic subject, and appropriate picture recording conditions can be easily designated before the high speed picture recording.

BRIEF DESCRIPTION OF THE DRAWINGS

FIGS. 2A and 2B are typical views each showing a state of slow reproduction according to a high speed photographic device 1;

FIGS. 3A and 3B are typical views each showing a state of live observation according to the high speed photographic device 1;

FIGS. 4A, 4B, and 4C are typical views each showing a state of synchronous observation according to the high speed photographic device 1;

FIGS. 11A and 11B are typical views each showing a state at a time of slow live observation according to a preferred embodiment 2 of the present invention.

DESCRIPTION OF THE PREFERRED EMBODIMENTS

Preferred Embodiment 1

Figure 1:
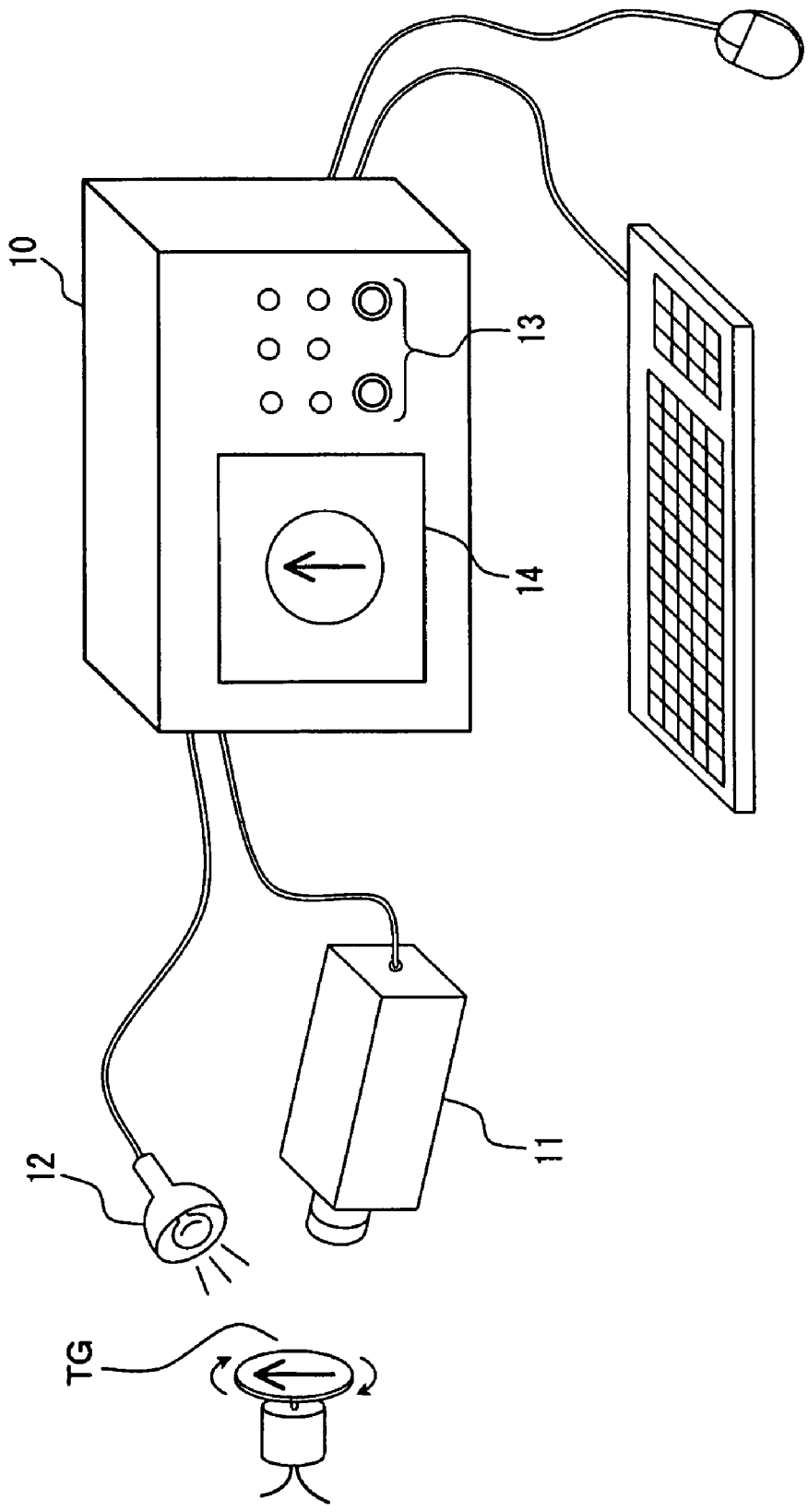
FIG. 1 is a view showing a configuration example of a high speed photographic device according to a preferred embodiment 1 of the present invention.

FIG. 1 is a view showing a configuration example of a high speed photographic device according to a preferred embodiment 1 of the present invention. The high speed photographic device 1 is composed of a camera 11 which is for photographing a photographic subject TG and a photographic control device 10 which controls the camera 11. The photographic control device 10 includes an operation unit 13 for which a user performs operational input, and a display unit 14 which is for displaying a photography image outputted from the camera 11.

The camera 11 is a high speed imaging unit which can photograph at a frame rate of 15 to 32000 frames per second (fps). The camera 11 incorporates a charge coupled device (CCD), a complementary metal oxide semiconductor (CMOS) image sensor, and the like which are made up of two dimensionally arranged pixels as an image sensor; and a photography image read from the image sensor is outputted to the photographic control device 10. Furthermore, an exposure time, photography timing, a photographing frame rate, and the like of the image sensor are controlled by the photographic control device 10. The camera 11 also includes a zoom mechanism and a focus adjustment mechanism; and zoom adjustment and focusing adjustment are performed by a user's manual operation which rotates a lens body tube.

An illuminating device 12 is an illuminating unit which illuminates the photographic subject TG and is used in the case where brightness of the photographic subject TG is not sufficient. The illuminating device 12 is an illuminator which performs direct current (DC) illumination, that is, an illuminator which continuously illuminates at a constant brightness and has no influence on high speed photography; and the illuminating device 12 is different from a stroboscope which is for synchronous photography.

The photographic control device 10 determines photographing conditions such as an exposure time, photography timing, a photographing frame rate of the camera 11 based on a user's operation to the operation unit 13, and outputs a control signal to the camera 11. In addition, for various operational inputs to the photographic control device 10 by the user, external input devices such as a keyboard and a mouse connected to the photographic control device 10 can be used, in addition to the operation unit 13 or in place of the operation unit 13.

Furthermore, the photographic control device 10 can make the display unit 14 display the photography image outputted from the camera 11. A display frame rate of the display unit 14 can be changed within an adjustment range of 1 to 60 fps. The minimum value (1 fps) of the adjustment range is a lower limit value of the display frame rate in which the user can recognize the photography image displayed on the display unit 14 as a moving picture image. On the other hand, the maximum value (60 fps) of the adjustment range is an upper limit value of the display frame rate in which the user can recognize switching of display on the display unit 14. 60 fps adopted as the upper limit value in the present preferred embodiment is set from a speed of switching display in which the user having a general dynamic vision can recognize. Of course, the dynamic vision varies in individuals; and therefore, it is to be understood that any value can be adopted if the above described upper limit value is between 30 and 120 fps that is a dispersion range of the dynamic vision. The reason why general TVs and liquid crystal display monitors adopt the range between 30 and 120 fps as their display cycles are that, as above described, the upper limit value of the speed of switching display in which the user can recognize with the naked eye usually exists within the range. For this reason, a visual minimum cycle in the present preferred embodiment means an inverse number of the upper limit value of the adjustment range of the above described display frame rate; its value is a value to be fallen between $1/120$ sec to $1/30$ see; and, description will be made below as $1/60$ sec that is a base value thereof.

The photographic subject TG is a dynamic body which periodically performs high speed motion which seems that its shape is not clearly visible. For example, a dynamic body which periodically repeats rotational motion and reciprocating motion is a typical example of the photographic subject TG. Furthermore, an article group which seems to move in high speed in an alignment direction in a state where a large number of articles are aligned at equally spaced intervals, for example, an aggregate of semifinished products to be conveyed on a production line is the same as the dynamic body which performs periodical motion when being looked from the camera 11, and is included in the photographic subject TG. In this case, description will be made as the photographic subject TG which performs rotational motion at a motion cycle Tcyc.

In the high speed photographic device 1, as a display method of the photography image, there are three methods of slow reproduction, live observation, and synchronous observation; and the photography image of the camera 11 can be displayed on the display unit 14 depending on a display method selected by the user. The respective display methods will be described below.

<Slow Reproduction>

FIGS. 2A and 2B are typical views each for explaining an example of the image display method according to the high speed photographic device 1, and a state at a time of slow reproduction is shown by setting a lateral direction as a temporal axis. In FIG. 2A, photography images to be outputted in order from the camera 11 are shown in a temporal sequence. The camera 11 repeats photography of the photographic subject TG at a photography cycle Tshot, and outputs a frame image every photography cycle Tshot. The photographic control device 10 performs picture recording of these frame images in order The photography cycle Tshot is designated by a user, and high speed picture recording at a maximum photographing frame rate of 32000 fps can be performed. Furthermore, trigger conditions of starting of picture recording are also designated by the user. In addition, frame numbers corresponding to their photographic order are given to the respective frame images shown in the drawing, and a mutual correspondence relation is shown.

In FIG. 2B, frame images to be displayed on the display unit 14 are shown in a temporal sequence. When the user performs a reproduction operation after performing picture recording, recorded frame images are shown on the display unit 14 in a photographed temporal sequence order. These frame images are displayed on the display unit 14 by being switched every display cycle Tdisp. The photography cycle Tshot is sufficiently shorter than the display cycle Tdisp, and the photography images are reproduction-displayed as moving picture images slower than an actual speed of the photographic subject TG. That is, slow reproduction is performed. Furthermore, a frame which starts reproduction and a frame which ends the reproduction can be designated by the user, and a frame range to be reproduced from among a large amount of frame images obtained by the high speed picture recording can be designated.

<Live Observation>

FIGS. 3A and 3B are typical views each for explaining an example of an image display method according to the high speed photographic device 1, and a state at a time of live observation is shown by setting a lateral direction as a temporal axis. In FIG. 3A, a state in which frame images photographed at a photography cycle Tshot are outputted in order from the camera 11 is shown in a temporal sequence, as in FIG. 2A.

In FIG. 3B, frame images to be displayed on the display unit 14 at the time of live observation are shown in a temporal sequence. It is the same as the slow reproduction display in that the frame images to be displayed on the display unit 14 are switched every display cycle Tdisp; however, there is a difference from the slow reproduction display in that photography and display are performed in parallel and a state of the photographic subject TG is displayed in real time on the display unit 14. That is, the frame image to be displayed on the display unit 14 at the time of live observation is the latest frame image in which the camera 11 has photographed just before, and the frame images to be displayed on the display unit 14 in order are not continuing frame images photographed by the camera 11.

In addition, a display in real time in this specification means motion in which a user can use a time delay from the photography to the display without a consciousness. For example, if the photographic subject TG is made to display without generating a time delay which is not more than many times as long as the display cycle Tdisp, preferably a time delay of not more than the display cycle Tdisp, it can be said to be the display in real time. On the other hand, motion which seems to generate a time delay of not less than several seconds is not included in the display in real time in this case.

<Synchronous Observation>

FIGS. 4A, 4B, and 4C are typical views each for explaining an example of an image display method according to the high speed photographic device 1, and a state at a time of synchronous observation is shown by setting a lateral direction as a temporal axis. In FIG. 4A, frame images to be outputted in order from the camera 11 are shown in a temporal sequence; in FIG. 4B, synchronous images obtained by thinning the frame images shown in FIG. 4A; and in FIG. 4C, frame images to be displayed on the display unit 14 are shown in a temporal sequence.

In synchronous observation, a synchronous cycle Tsync is designated by a user, and a photography cycle Tshot is automatically adjusted so as to be 1/N as long as the synchronous cycle Tsync. The above mentioned N is a positive integer and there may be N=1; and in FIGS. 3A and 3B, there is exemplified a case of N=4. In the frame images to be outputted from the camera 11 at the photography cycle Tshot, (N−1) frame of N frames is thinned, and the synchronous image at the synchronous cycle Tsync is extracted. The display unit 14 switches the frame images to be displayed every display cycle Tdisp so that the latest synchronous image is always displayed.

As in the case of the live observation, the frame image to be displayed on the display unit 14 at the time of synchronous observation is the latest frame image, and a motion state of the photographic subject TG is displayed in real time. For this reason, if the user adjusts the synchronous cycle Tsync, its adjustment result is immediately reflected on the display of the display unit 14. Therefore, it is possible to easily make a photography image, which is displayed as a moving picture image, remain stationary. In doing so, if the synchronous cycle Tsync is adjusted, it is possible to make the synchronous cycle Tsync coincide with a motion cycle Tcyc×M (M is an integer of not less than 1) of the photographic subject TG, and to make the photographic subject TG, which repeats high speed motion, remain stationary in a pseudo manner and display on the display unit 14.

In order to actualize such a synchronous observation, a step width ΔTsync in the case where the user adjusts the synchronous cycle Tsync has to be sufficiently small. The step width ΔTsync is preliminarily determined as a value smaller than 16.7 ms (60 fps) that is the minimum value of the display cycle Tdisp. In addition, the minimum value of a feasible step width is limited by a data reading time and the like from the image sensor of the camera 11. In general, the minimum value of the step width of the photography cycle Tshot is not less than a reading time of one pixel; and therefore, the minimum value of the step width ΔTsync of the synchronous cycle also becomes not less than N times as long as the reading time of one pixel. For example, if in the case where the minimum value of the step width of the photography cycle Tshot is limited by a data reading time for one line of the image sensor, the minimum value of the step width ΔTsync of the synchronous cycle becomes not less than N times as long as the data reading time for one line of the image sensor.

Furthermore, an adjustment range of the synchronous cycle Tsync is preliminarily determined so as to be a range which does not include less than 16.7 ms (60 fps) that is the minimum value of the display cycle Tdisp, and does not include a value exceeding 1000 ms (1 fps) that is the maximum value of the display cycle Tdisp. The reason is that if the synchronous cycle Tsync falls below the minimum value of the display cycle Tdisp, the synchronous image which is not displayed on the display unit 14 merely increases; and if the synchronous cycle Tsync exceeds the maximum value of the display cycle Tdisp, there can be performed only a certain level of display which cannot be recognized as a moving picture image.

That is, the adjustment range which can adjust the synchronous cycle Tsync is not unnecessarily extended, and is limited within a range in which the photography image can be displayed in real time (that is, an adjustment range of the display cycle Tdisp); and at the same time, an adjustable step width ΔTsync is set to be sufficiently fine and enables fine adjustment. Therefore, it becomes easy to perform an adjustment work which makes the synchronous cycle Tsync coincide with an integral multiple as long as the motion cycle Tcyc of the photographic subject TG.

<Configuration of Photographic Control Device 10>

Figure 5:
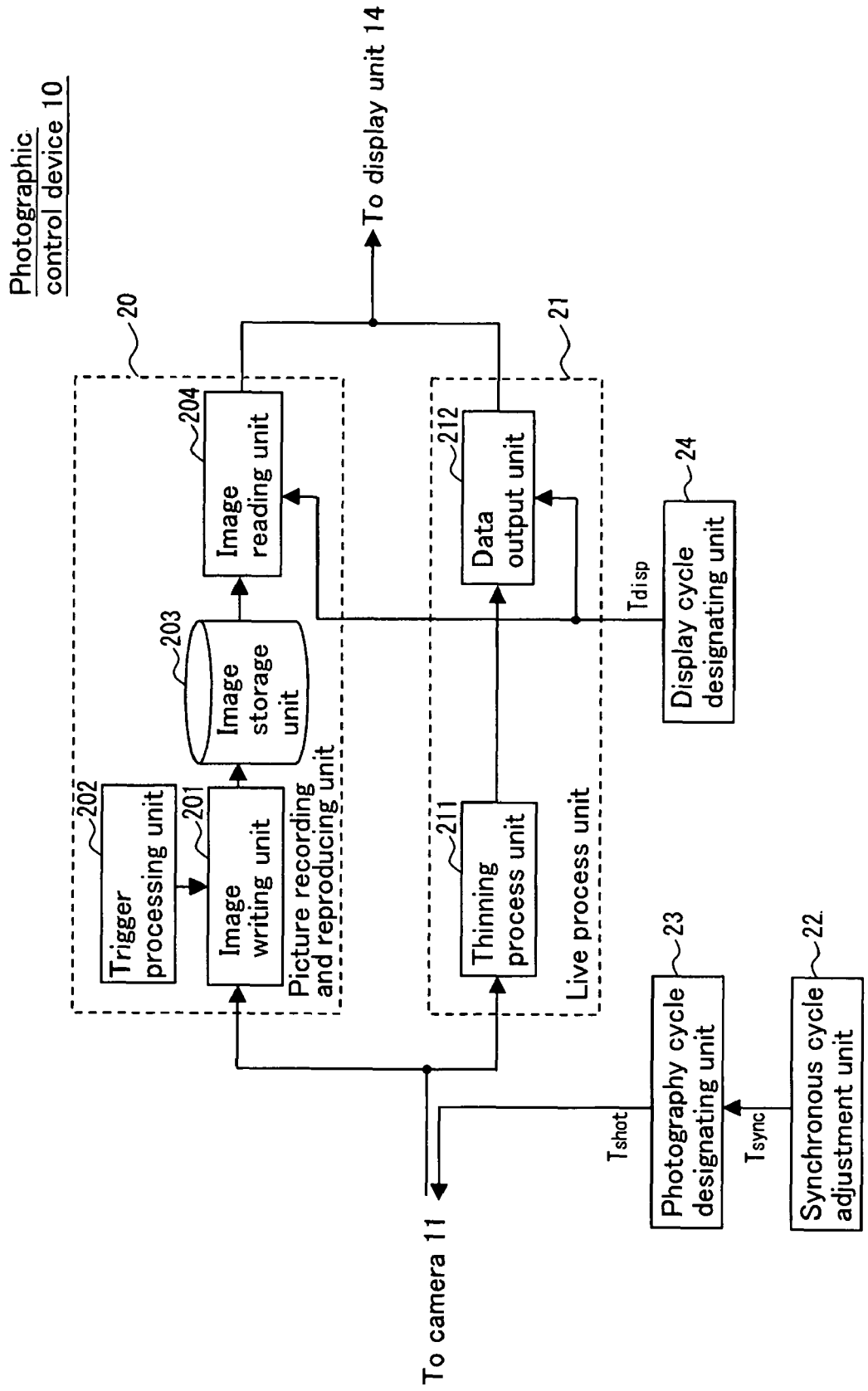
FIG. 5 is a block diagram showing an internal configuration example regarding a photographic control device 10 shown in FIG. 1.

FIG. 5 is a block diagram showing an internal configuration example regarding the photographic control device 10 shown in FIG. 1. The photographic control device 10 is configured by a picture recording and reproducing unit 20, a live process unit 21, a synchronous cycle adjustment unit 22, a photography cycle designating unit 23, and a display cycle designating unit 24.

The picture recording and reproducing unit 20 is a unit which is for picture recording and reproducing photography images by the camera 11 and is used for performing slow reproduction. That is, the picture recording and reproducing unit 20 performs picture recording of frame images to be inputted every photography cycle Tshot from the camera 11, reproduces the recorded frame images every display cycle Tdisp in order, and outputs to the display unit 14.

The picture recording and reproducing unit 20 is composed of an image writing unit 201, a trigger processing unit 202, an image storage unit 203, and an image reading unit 204. The image writing unit 201 writes the frame images to be inputted from the camera 11 to the image storage unit 203 every photography cycle Tshot. A timing at which the image writing unit 201 starts writing is given by the trigger processing unit 202. The trigger processing unit 202 starts writing of the frame images based on the frame images from the camera 11, or based on trigger input from the outside or the operation unit 13. The image storage unit 203 is a data storage device which can hold a large number of frame images; and in the case where frame images exceeding its storage capacity are written, it is preferable that the image storage unit 203 serves as a ring buffer which overwrites in order from the oldest frame image. The image reading unit 204 is a unit which reads the frame images every display cycle Tdisp from the image storage unit 203, and outputs to the display unit 14. A reproduction range, that is, a starting frame and an ending frame of the reproduction can be designated by a user; and within the designated range, the frame images can be reproduced and displayed in a picture recording order.

The live process unit 21 is a unit which is for displaying in real time the photographic subject TG on the display unit 14, and is used when live observation and synchronous observation are performed. The live process unit 21 performs thinning of the frame with respect to the frame images to be inputted every photography cycle Tshot from the camera 11, converts to the frame image of every display cycle Tdisp, and outputs to the display unit 14 in real time.

The live process unit 21 is composed of a thinning process unit 211 and a data output unit 212. The thinning process unit 211 thins the frames at a preliminarily determined rate with respect to the frame images inputted from the camera 11 and reduces the frame rate. For example, the synchronous images shown in FIG. 4B are frame images obtained by performing thinning process of the frame images inputted from the camera 11 to ¼ thereof. In addition, in the case of the synchronous observation which makes the photography cycle Tshot coincide with the synchronous cycle Tsync, the thinning process is not required. The data output unit 212 outputs the latest frame image after the thinning process to the display unit 14 every display cycle Tdisp. In the case where a new frame image is not inputted from the thinning process unit 211 within the display cycle Tdisp, the frame image which is the same as the previous one is outputted. Furthermore, in the case where not less than two new frame images are inputted from the thinning process unit 211 within the display cycle Tdisp, the latest new frame image is outputted.

The synchronous cycle adjustment unit 22 is a unit which is for designating the synchronous cycle Tsync based on a user's operation of the operation unit 13. An adjustment range which can adjust the synchronous cycle Tsync is preliminarily given as a range which does not include a value less than the minimum value of the display cycle Tdisp and a value exceeding the maximum value of the display cycle Tdisp. For example, a range from the minimum value to the maximum value of the display cycle Tdisp can be the adjustment range of the synchronous cycle Tsync. Furthermore, a step width ΔTsync which can make the synchronous cycle Tsync change is a value smaller than the minimum value of the display cycle Tdisp, and the user can perform fine adjustment of the synchronous cycle Tsync.

The photography cycle designating unit 23 is a unit which is for designating the photography cycle Tshot; the photography cycle Tshot is designated based on the user's operation of the operation unit 13 at a time of picture recording and at a time of live observation; and the photography cycle Tshot is automatically designated based on the synchronous cycle Tsync at a time of synchronous observation. The photography cycle Tshot at the time of synchronous observation is required as a cycle which becomes the synchronous cycle Tsync after the thinning process of the frame, that is, as Tsync/N.

In addition, the camera 11 maintains so that an exposure time of the image sensor becomes constant regardless of the photography cycle Tshot at the time of synchronous observation. That is, the exposure time of the image sensor is a time which can be ensured even in the case where the photography cycle Tshot is the shortest; and even the synchronous cycle Tsync fluctuates, brightness of the photography image to be displayed on the display unit 14 does not fluctuate.

The display cycle designating unit 24 is a unit which is for designating the display cycle Tdisp based on the user's operation of the operation unit 13. The designated display cycle Tdisp is outputted to the image reading unit 204 in the picture recording and reproducing unit 20, the data output unit 212 in the live process unit 21, and the display unit 14.

Figure 6:
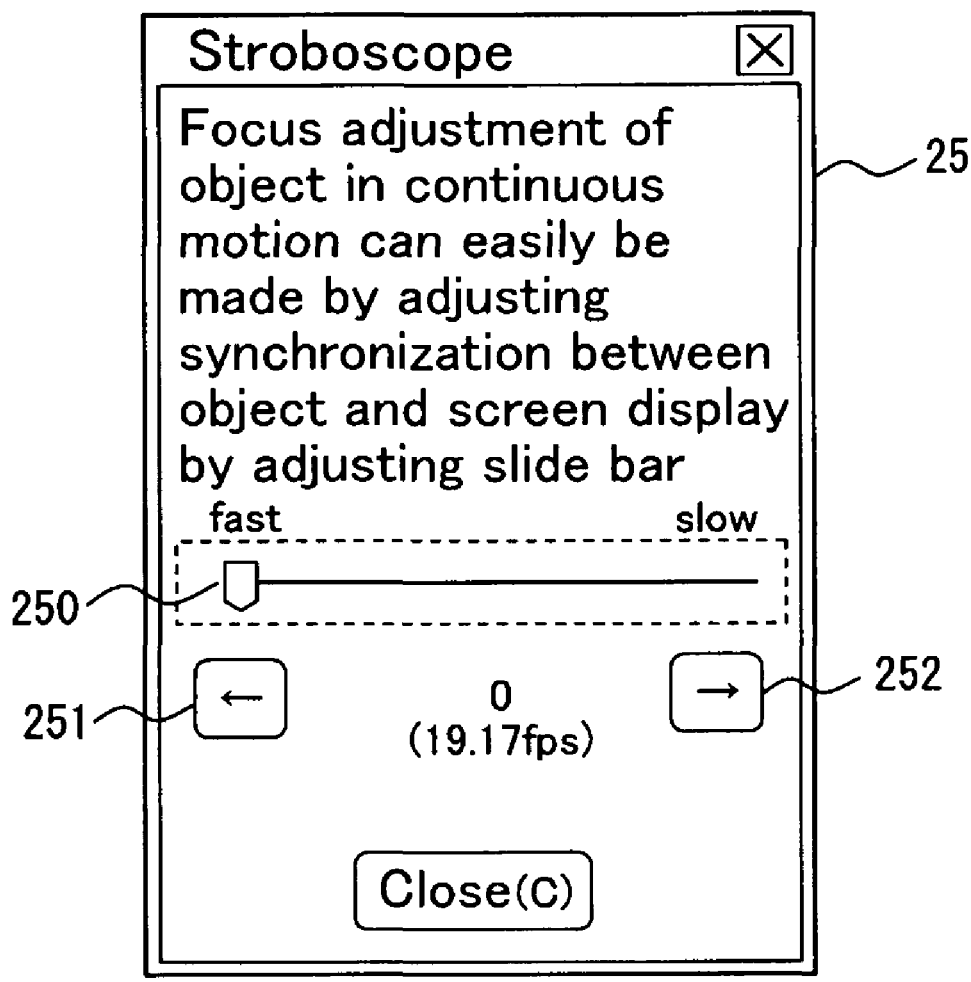
FIG. 6 is a view showing an example of a synchronous cycle adjustment unit 22 shown in FIG. 5.

FIG. 6 is a view showing an example of the synchronous cycle adjustment unit 22 shown in FIG. 5. The synchronous cycle adjustment unit 22 is displayed as a window 25 for adjusting the synchronous cycle on the display unit 14 of the photographic control device 10. In the window, a slide handle 250 which is for changing the synchronous cycle Tsync and up and down buttons 251 and 252 are provided. The slide handle 250 can be moved by using a mouse; and therefore, the synchronous cycle Tsync can be roughly designated. On the other hand, the up and down buttons 251 and 252 can be clicked by using the mouse; and therefore, a change can be made every step width ΔTsync, and the synchronous cycle Tsync can be finely adjusted.

Figure 7:
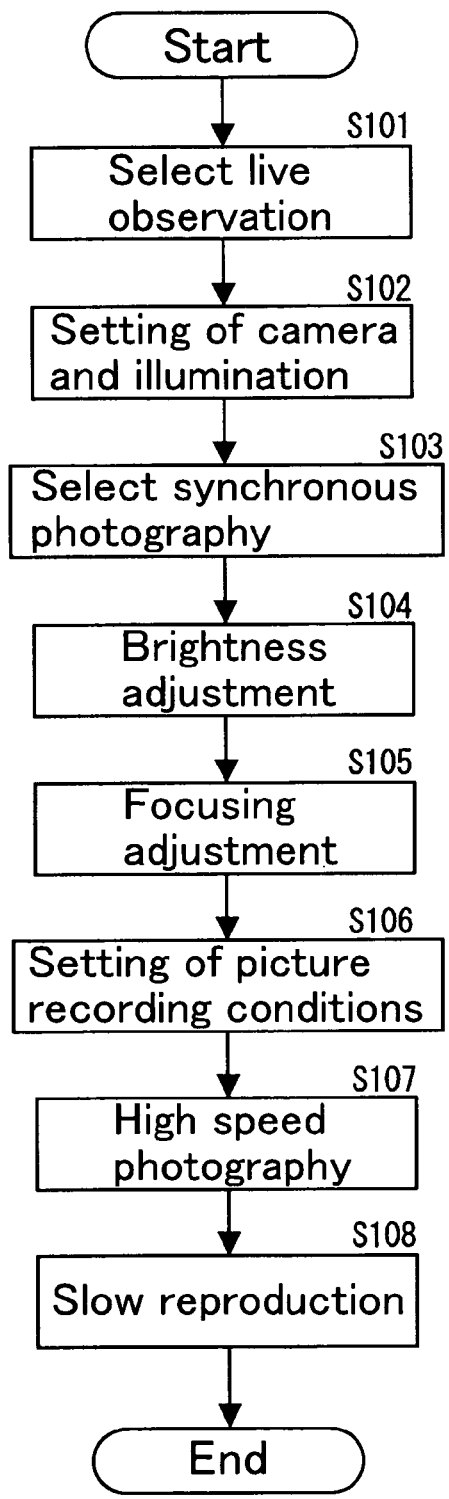
FIG. 7 is a flow chart showing a procedure example in the case of performing high speed photography and slow reproduction of a new photographic subject TG using the high speed photographic device 1.

FIG. 7 is a flow chart having steps S101 to S108 and showing a procedure example in the case of performing high speed photography and slow reproduction of a new photographic subject TG using the high speed photographic device 1. First, as a display method of the photographic control device 10, live observation is selected by a user (step S101), and setting of the camera 11 and the illuminating device 12 is performed (step S102). The setting is a work for placing the camera 11 and the illuminating device 12 toward the photographic subject TG during high speed motion, and a user performs while watching the display unit 14. In the case of live observation, since the photographic subject TG is displayed in real time, the camera 11 and the illuminating device 12 can be smoothly placed. In addition, as shown in FIG. 3, noncontiguous states of the photographic subject TG are displayed one after the other in the live observation; however, there is no problem for the setting work.

Next, the display method of the photographic control device 10 is switched from the live observation to the synchronous observation (step S103). After switching to the synchronous observation, the user adjusts the synchronous cycle Tsync and stops the photographic subject TG displayed on the display unit 14. In this state, brightness adjustment of the photographic subject TG and focusing adjustment of the camera 11 are performed (steps S104 and S105). The brightness adjustment of the photographic subject TG is performed by adjusting the amount of light and direction of the illuminating device 12. Furthermore, the focusing adjustment is performed by that the user operates a focusing mechanism of the camera 11. At the time of the synchronous observation, an image of the photographic subject TG made to remain stationary in a pseudo manner is displayed on the display unit 14; and therefore, photography states such as brightness and focus can be confirmed in detail and with ease. In addition, since the image is displayed in real time, if the brightness and focus are made to change, its influence is immediately reflected in the image on the display unit 14. Therefore, adjustment of the brightness and focus can be performed easily and promptly without stopping the photographic subject TG.

When the adjustment of the brightness and focus is completed, setting of picture recording conditions at a time of high speed picture recording is performed (step S106). For example, a frame rate, a time of picture recording (the number of picture recording frames), trigger timing, and the like at the time of picture recording are designated by the user as the picture recording conditions. The setting of such picture recording conditions may be performed by switching the display method of the photographic control device 10 to the live observation.

In the case of setting the picture recording conditions, if an approximate motion speed of the photographic subject TG is not known, it is difficult to designate an appropriate frame rate. However, in this case, it is known that the synchronous observation is performed in advance and the photographic subject TG operates at a cycle of not more than the synchronous cycle Tsync. Therefore, designation itself of the frame rate for the picture recording becomes easy as compared with a conventional method.

After that, if the user designates a start of picture recording, the picture recording is performed (step S107). That is, after trigger conditions are approved, frame images corresponding to the time of picture recording are stored in the image storage unit 203 of the photographic control device 10. If the user designates reproduction after completion of the picture recording, slow reproduction of the frame images held in the image storage unit 203 is performed (step S108).

Figure 8:
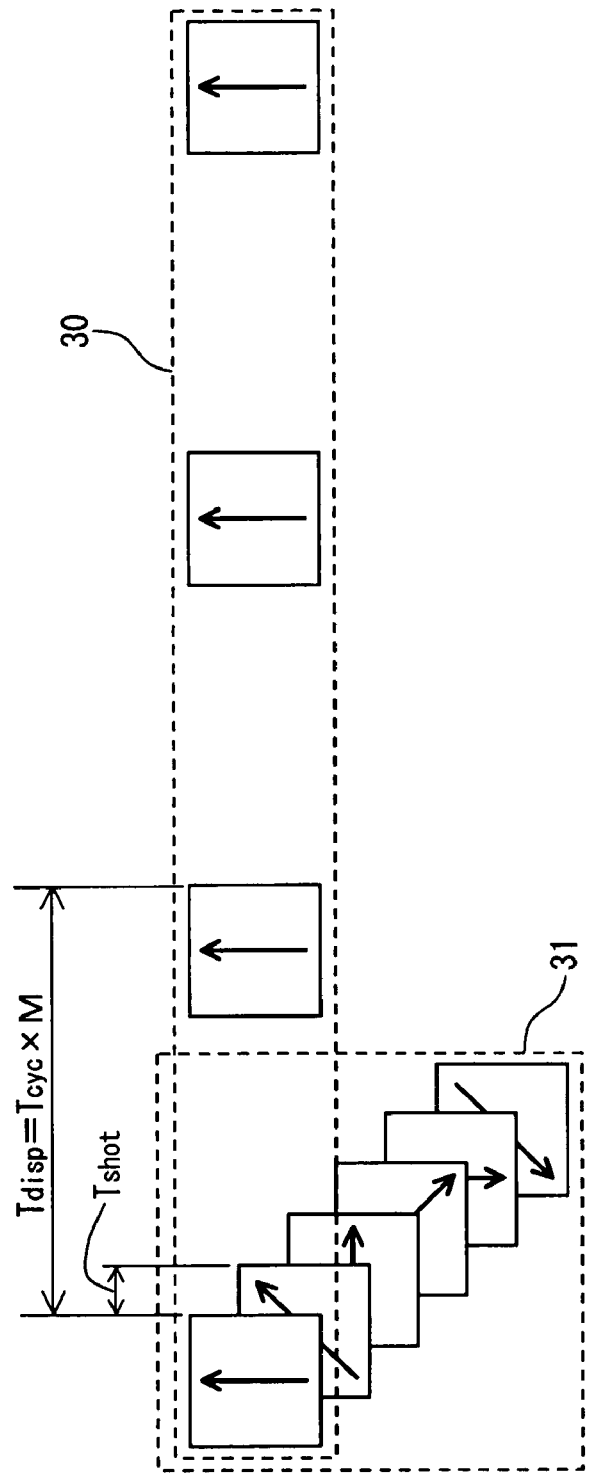
FIG. 8 is a conceptual view for explaining by comparing a frame image to be displayed at a time of synchronous observation and at a time of slow reproduction.

FIG. 8 is a conceptual view for explaining by comparing frame images to be displayed at a time of synchronous observation and at a time of slow reproduction. Reference numeral 30 shown in the drawing is frame images to be displayed at the time of synchronous observation, and images photographed every display cycle Tdisp corresponding to an integral multiple as long as a motion cycle Tcyc of the photographic subject TG are displayed in real time on the display unit 14. That is, images photographed in synchronization with the motion cycle Tcyc of the photographic subject and made to remain stationary in a pseudo manner can be displayed in real time. On the other hand, reference numeral 31 shown in the drawing is frame images to be displayed at the time of slow reproduction, and images photographed at high speed every photography cycle Tshot are reproduced and displayed in order.

Figure 9:
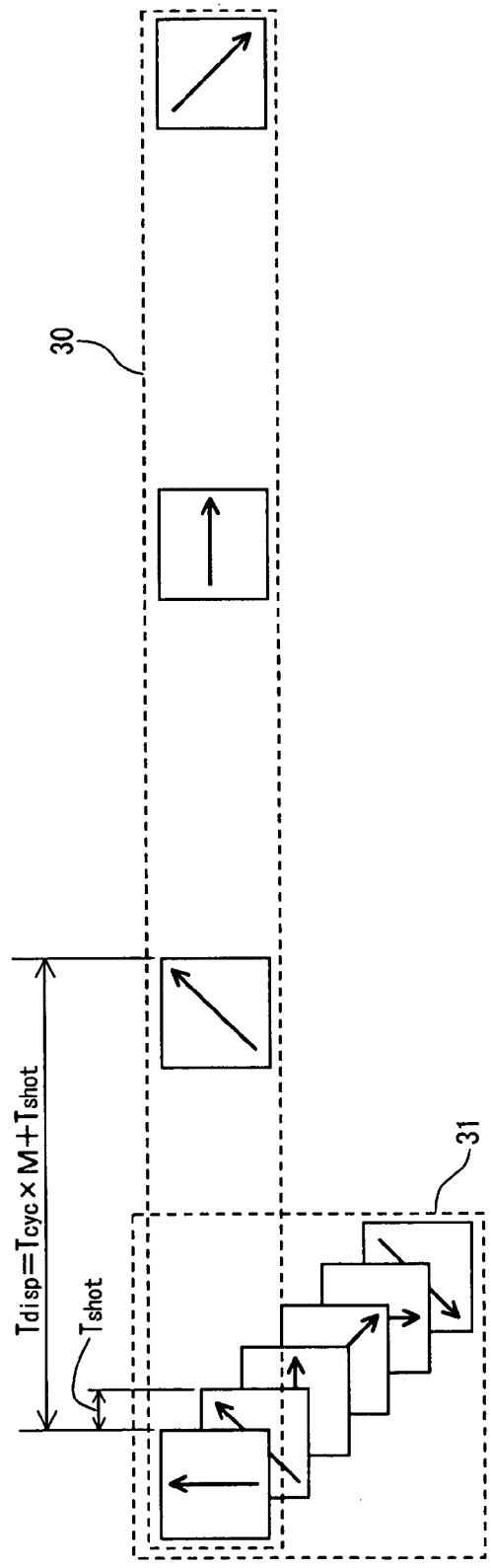
FIG. 9 is a view for explaining a method which performs a display similar to slow reproduction at a time of synchronous observation.

FIG. 9 is a view for explaining a method which performs a display similar to at a time of slow reproduction, at a time of synchronous observation. At the time of synchronous observation, a synchronous cycle Tsync is made to differentiate slightly from a motion cycle Tcyc×M (M is an integer) of the photographic subject TG; and accordingly, a display almost the same as at the time of slow reproduction can be performed. In the drawing, there is shown a case where a difference between the synchronous cycle Tsync and the motion cycle Tcyc×M coincides with the photography cycle Tshot. In this case, images similar to the slow reproduction can be displayed in real time.

In the synchronous observation which is slightly out of synchronization, a display close to the display at the time of slow reproduction can be performed; however, a continuous motion state of the photographic subject TG is not displayed as in the slow reproduction, but, a discrete motion state in periodic motion is displayed. Therefore, confirmation cannot be made by displaying even phenomenon which is not periodic on the display unit 14 as at the time of slow reproduction; however, there is an advantage in that a display state almost similar to at the time of slow reproduction can be displayed in real time.

Further, even in the case where a motion speed of the photographic subject TG is too fast to sufficiently observe the motion state of the photographic subject TG even in the slow reproduction, it becomes possible to observe the motion state of the photographic subject TG by using the synchronous observation which is slightly out of synchronization.

In the present preferred embodiment, description is made by an example in the case where a user independently designates the synchronous cycle Tsync and the display cycle Tdisp; however, the present invention is not limited to such case. For example, the display cycle Tdisp may be automatically adjusted so as to coincide with the synchronous cycle Tsync designated by the user.

Figure 10:
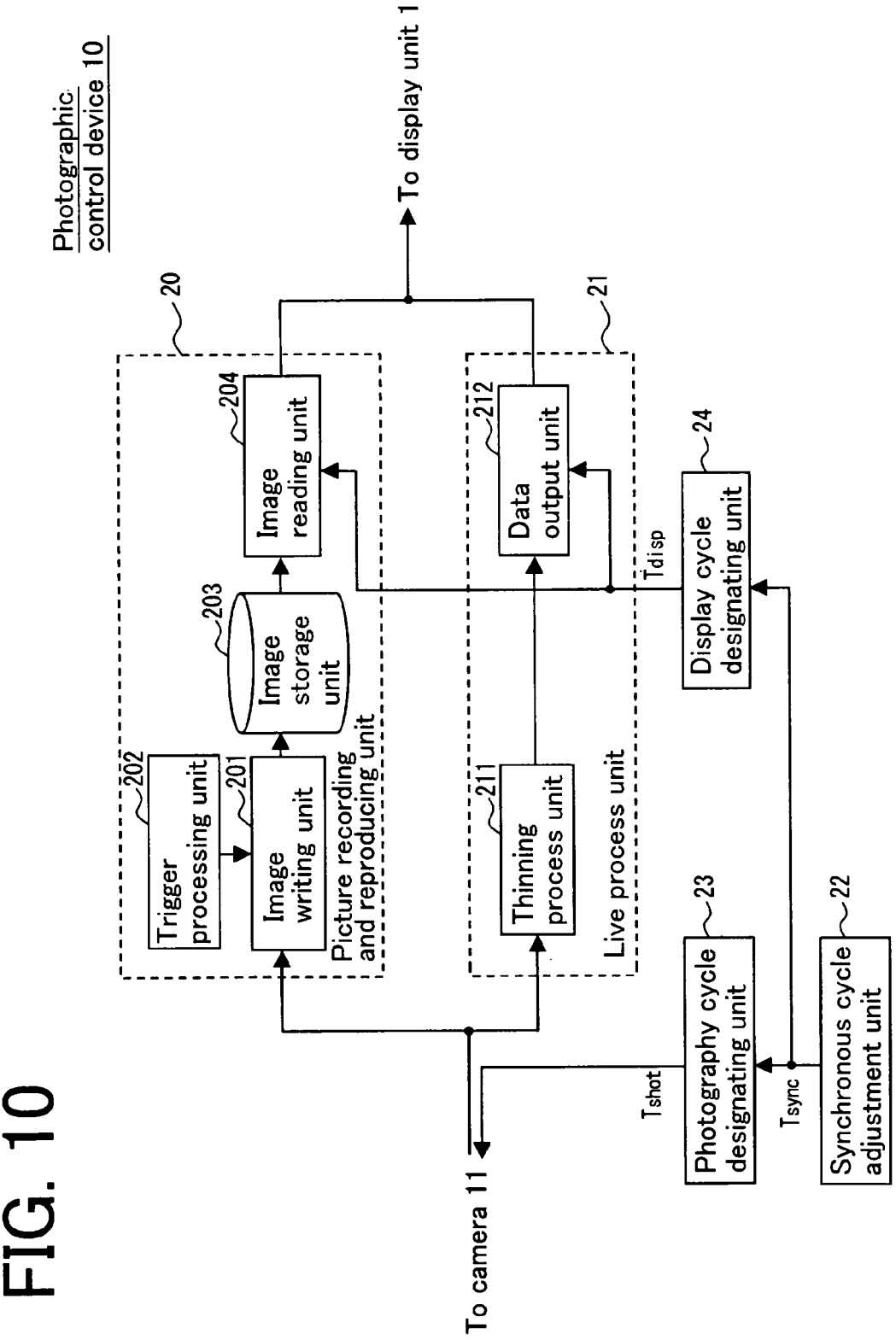
FIG. 10 is a block diagram showing a configuration example of a high speed photographic device in which a display cycle Tdisp is made to coincide with a synchronous cycle Tsync.

FIG. 10 is a block diagram showing a configuration example of a high speed photographic device in which a display cycle Tdisp is made to coincide with a synchronous cycle Tsync. An adjustment range of the synchronous cycle Tsync does not include less than the minimum value of the display cycle Tdisp and a value exceeding the maximum value of the display cycle Tdisp; and therefore, the synchronous cycle Tsync designated by the user can be the display cycle Tdisp directly. In this case, a data output unit 212 is not required.

Furthermore, in the present preferred embodiment, description is made by the case where a photography cycle Tshot is automatically determined in response to a synchronous cycle Tsync designated by a user; however, the present invention is not limited to such case. For example, the photography cycle Tshot is set to be constant, and integer N may be made to change in response to the synchronous cycle Tsync designated by the user. That is, a thinning rate in a thinning process unit 211 may be made to change in response to the synchronous cycle Tsync. In this case, if the photography cycle Tshot is fixed to the minimum value, a step width ΔTsync in the case of adjusting the synchronous cycle Tsync can be set to be the smallest.

Preferred Embodiment 2

In the preferred embodiment 1, there is described the high speed photographic device which can perform a display by slow reproduction, live observation, and synchronous observation. On the other hand, in the present preferred embodiment, there will be described a high speed photographic device which can also perform a display by slow live observation in addition to the above mentioned display methods. In addition, a fundamental configuration of a high speed photographic device 1 is the same as that of the preferred embodiment 1 shown in FIGS. 1, 2A, and 2B, and their description will not be repeated.

FIGS. 11A and 11B are typical views each for explaining an example of a display method according to a preferred embodiment 2 of the present invention; and a state at the time of slow live observation is shown by setting a lateral direction as a temporal axis. In FIG. 11A, a state where frame images photographed at a photography cycle Tshot are outputted from a camera 11 in order is shown in a temporal sequence. The frame images are written to an image storage unit 203 by an image writing unit 201. In addition, frame numbers corresponding to their photographic order are given to the respective frame images shown in the drawing, and a mutual correspondence relation is shown.

In FIG. 11B, frame images to be displayed on a display unit 14 at the time of slow live observation are shown in a temporal sequence. The slow live observation is the same as the slow reproduction in that the frame images read from the image storage unit 203 are switched and displayed on the display unit 14 every display cycle Tdisp. In this regard, however, in the slow reproduction, reproduction is started after completion of picture recording of all frame images; on the contrary, in the slow live observation, there is a difference in that reproduction is started before the completion of picture recording, and reproduction display is performed almost in real time by alternately repeating high speed picture recording and slow reproduction.

In the slow live observation, frame images of preliminarily determined numbers of sheets are photographed at a photography cycle Tshot, and stored in the image storage unit 203 in order. An aggregate of the continuously photographed frame images is referred to as a picture recording unit. If photography for one picture recording unit is completed, reproduction display for the picture recording unit is immediately started. That is, the respective frame images which constitute the latest picture recording unit are read from the image storage unit 203 in order, and switched and displayed on the display unit 14. If the reproduction display is completed, photography of the next picture recording unit is started again. In doing so, the high speed picture recording and the slow reproduction of the picture recording unit are repeated; and accordingly, a display which is the same as slow reproduction display can be performed in almost real time except for a unit of the picture recording unit.

In the case where a motion cycle Tcyc of the photographic subject TG is longer than the minimum value of the photography cycle Tshot, it is possible to find that the motion cycle Tcyc of the photographic subject TG is not less than a certain value by performing the slow live observation. On the other hand, it is possible to find a synchronous cycle Tsync corresponding to an integral multiple as long as the motion cycle Tcyc of the photographic subject TG by using the synchronous observation. For this reason, a value smaller than the motion cycle Tcyc of the photographic subject TG and a value larger than the motion cycle Tcyc can be respectively obtained by using the slow live observation and the synchronous observation, and a range in which the motion cycle Tcyc of the photographic subject TG is included can be gradually narrowed; and therefore, the motion cycle Tcyc can be easily found.

If the motion cycle Tcyc of the photographic subject TG can be found, or if the range in which the motion cycle Tcyc is included can be known, an appropriate frame rate can be easily selected when picture recording conditions are set in a step S107 shown in FIG. 7.

DESCRIPTION OF REFERENCE NUMERALS

1 High speed photographic device
10 Photographic control device
11 Camera
12 Illuminating device
13 Operation unit
14 Display unit
20 Video recording and reproducing unit
21 Live process unit
22 Synchronous cycle adjustment unit
23 Photography cycle designating unit
24 Display cycle designating unit
201 Image writing unit
202 Trigger processing unit
203 Image storage unit
204 Image reading unit
211 thinning process unit
212 Data output unit
Tcyc Motion cycle
Tshot Photography cycle
Tsync Synchronous cycle
Tdisp Display cycle
TG Photographic subject

What is claimed is:

1. A high speed photographic device which photographs a photographic subject which periodically repeats invisible high speed motion, and displays in real time a photography image which is in synchronization with a motion cycle of the photographic subject, the high speed photographic device comprising:
   a synchronous cycle adjustment unit which is for designating a synchronous cycle that is M times (M is an integer of not less than 1) as long as the motion cycle;
   an imaging unit which is made up of a solid state imaging device composed of a plurality of pixels, and repeatedly photographs the photographic subject at a photography cycle that is 1/N (N is an integer of not less than 1) as long as the synchronous cycle; and
   a display unit which displays in real time the photographic subject by displaying the photography image of every synchronous cycle photographed by the imaging unit, every display cycle of not less than a visual minimum cycle in which switching of display is visible,
   wherein the synchronous cycle adjustment unit is made up of a unit which adjusts the synchronous cycle at not less than a time which reads one pixel of the solid state imaging device and a step width smaller than the visual minimum cycle, within an adjustment range which does not include less than the visual minimum cycle, and
   wherein when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle.

2. The high speed photographic device according to claim 1,
   wherein the visual minimum cycle is 1/120 sec.

3. The high speed photographic device according to claim 1,
   wherein the photography cycle has the minimum value which is smaller than the visual minimum cycle.

4. The high speed photographic device according to claim 1,
   wherein the display cycle is made to coincide with the synchronous cycle.

5. The high speed photographic device according to claim 1,
   wherein the solid state imaging device is configured by arranging the pixels in a two dimensional array.

6. The high speed photographic device according to claim 1,
   wherein the adjustment range of the synchronous cycle is not more than the maximum cycle of the switching of display by the display unit which is recognizable as a moving picture image.

7. The high speed photographic device according to claim 6,
   wherein the maximum value of the synchronous cycle is 1 sec.

8. The high speed photographic device according to claim 1,
   further comprising a thinning process unit which extracts the photography image of every synchronous cycle from the photography image of every photography cycle by thinning the photography image generated by the imaging unit.

9. The high speed photographic device according to claim 8,
   wherein the display unit displays the latest photography image of the photography image of every synchronous cycle extracted by the thinning process unit.

10. The high speed photographic device according to claim 1,
    further comprising an exposure time adjustment unit which adjusts an exposure time of the imaging unit,
    the exposure time adjustment unit holding the exposure time constant even in the case where the synchronous cycle is changed.

11. The high speed photographic device according to claim 1,
    further comprising only an illuminating unit of direct current illumination as the illuminating unit which is for illuminating the photographic subject.

12. A high speed photographic device which photographs a photographic subject which periodically repeats invisible high speed motion, and displays in real time a photography image which is in synchronization with a motion cycle of the photographic subject, the high speed photographic device comprising:
    a synchronous cycle adjustment unit which is for designating a synchronous cycle that is M times (M is an integer of not less than 1) as long as the motion cycle;
    an imaging unit which is made up of a solid state imaging device composed of a plurality of pixels, and repeatedly photographs the photographic subject at a photography cycle that is 1/N (N is an integer of not less than 1) as long as the synchronous cycle; and
    a display unit which displays in real time the photographic subject by displaying the photography image of every synchronous cycle photographed by the imaging unit, every variable display cycle,
    wherein the display cycle has the minimum value which is larger than the minimum value of the photography cycle, wherein the synchronous cycle adjustment unit is made up of a unit which adjusts the synchronous cycle at not less than a time which reads one pixel of the solid state imaging device and a step width smaller than the minimum value of the display cycle, within an adjustment range which does not include less than the minimum value of the display cycle, and wherein when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle.

13. The high speed photographic device according to claim 12, wherein the display cycle is made to coincide with the synchronous cycle.

14. The high speed photographic device according to claim 12, wherein the solid state imaging device is configured by arranging the pixels in a two dimensional array.

15. The high speed photographic device according to claim 12, wherein the adjustment range of the synchronous cycle is not more than the maximum cycle of the switching of display by the display unit which is recognizable as a moving picture image.

16. The high speed photographic device according to claim 12, further comprising a thinning process unit which extracts the photography image of every synchronous cycle from the photography image of every photography cycle by thinning the photography image generated by the imaging unit.

17. The high speed photographic device according to claim 12, further comprising an exposure time adjustment unit which adjusts an exposure time of the imaging unit, the exposure time adjustment unit holding the exposure time constant even in the case where the synchronous cycle is changed.

18. The high speed photographic device according to claim 12, further comprising only an illuminating unit of direct current illumination as the illuminating unit which is for illuminating the photographic subject.

19. A high speed photographic device which photographs a photographic subject which periodically repeats invisible high speed motion, and displays in real time a photography image which is in synchronization with a motion cycle of the photographic subject, the high speed photographic device comprising:

a synchronous cycle adjustment unit for which a user designates a synchronous cycle that is M times (M is an integer of not less than 1) as long as the motion cycle;

an imaging unit which is made up of a solid state imaging device composed of a plurality of pixels, and photographs the photographic subject at a constant photography cycle;

a thinning process unit which extracts the photography image of every synchronous cycle from the photography image of every photography cycle by thinning the photography image generated by the imaging unit; and a display unit which displays in real time the photographic subject by displaying the photography image of every synchronous cycle extracted by the thinning process unit, every display cycle of not less than a visual minimum cycle in which switching of display is visible, wherein the synchronous cycle adjustment unit is made up of a unit which adjusts the synchronous cycle at not less than a time which reads one pixel of the solid state imaging device and a step width smaller than the visual minimum cycle, within an adjustment range which does not include less than the visual minimum cycle, and wherein when the synchronous cycle is changed by the synchronous cycle adjustment unit, the imaging unit continuously photographs the photographic subject at a photography cycle corresponding to a changed synchronous cycle, and the display unit continuously displays the photography image of every changed synchronous cycle.

20. A method for controlling a high speed photographic device which photographs a photographic subject which periodically repeats invisible high speed motion, and displays in real time a photography image which is in synchronization with a motion cycle of the photographic subject, the method for controlling the high speed photographic device comprising:

a synchronous cycle adjustment step for which a user designates a synchronous cycle that is M times (M is an integer of not less than 1) as long as the motion cycle;

an imaging step which repeatedly photographs the photographic subject at a photography cycle that is 1/N (N is an integer of not less than 1) as long as the synchronous cycle by using an imaging unit made up of a solid state imaging device composed of a plurality of pixels; and a display step which displays in real time the photographic subject by displaying the photography image of every synchronous cycle photographed by the imaging unit, every display cycle of not less than a visual minimum cycle in which switching of display is visible, wherein in the synchronous cycle adjustment step, the synchronous cycle can be adjusted at not less than a time which reads one pixel of the solid state imaging device and a step width smaller than the visual minimum cycle, within an adjustment range which does not include less than the visual minimum cycle, and wherein when the synchronous cycle is changed by the synchronous cycle adjustment step, the photographic subject is continuously photographed at a photography cycle corresponding to a changed synchronous cycle by the imaging step, and the photography image of every changed synchronous cycle is continuously displayed by the display step.

\* \* \* \* \*